Aug. 25, 1931.  C. VON RIESEN  1,820,331
CLUTCH
Filed May 27, 1929   2 Sheets-Sheet 1
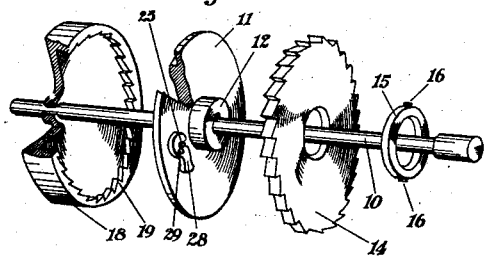
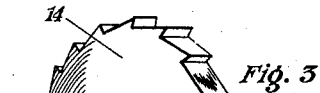
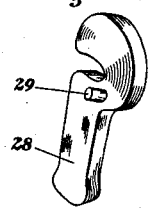
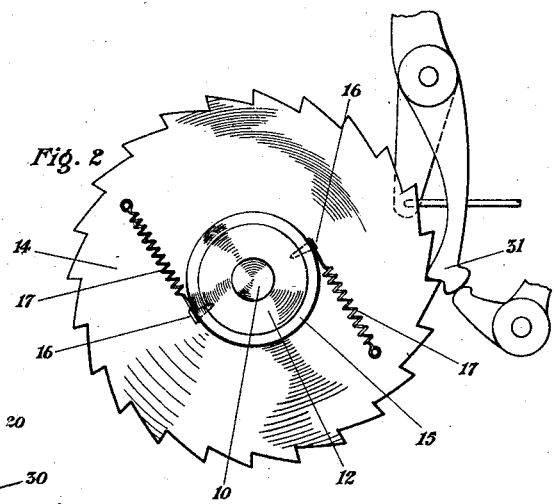
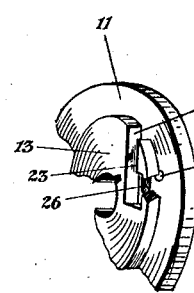
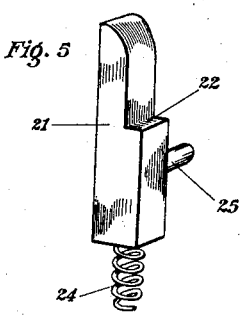
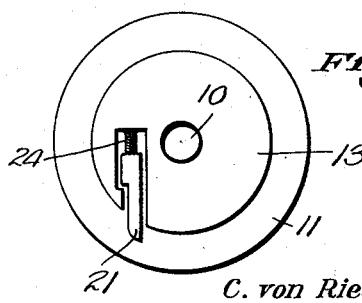
Inventor
C. von Riesen
By Emil F. Lange
Attorney

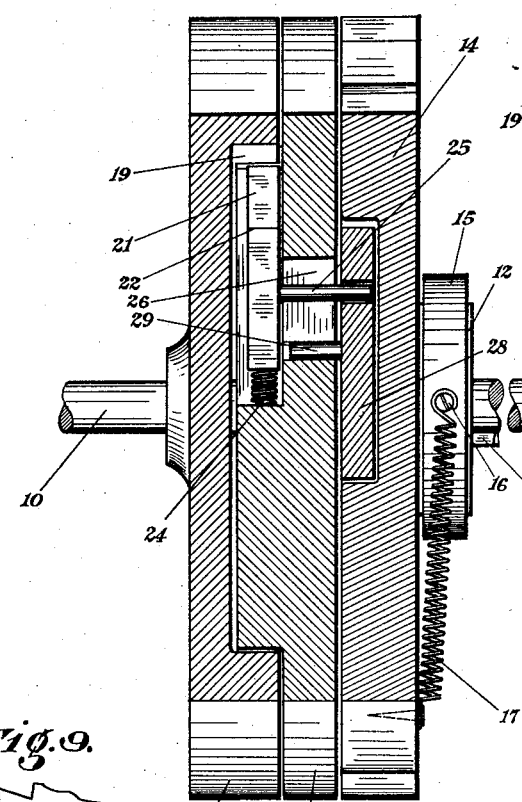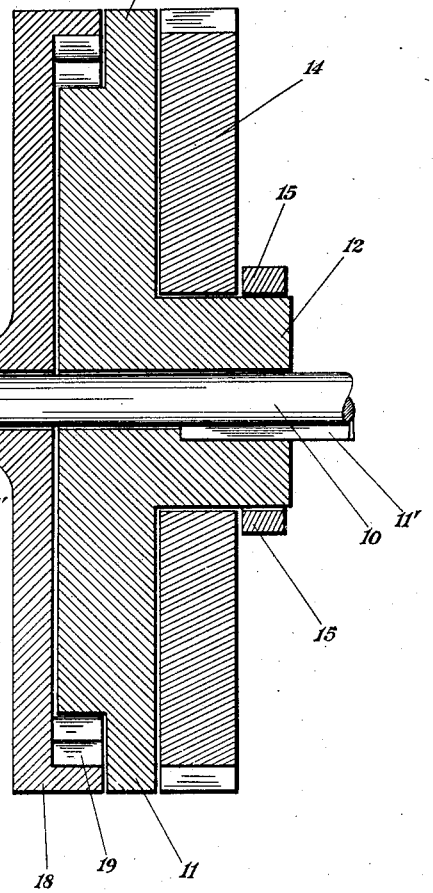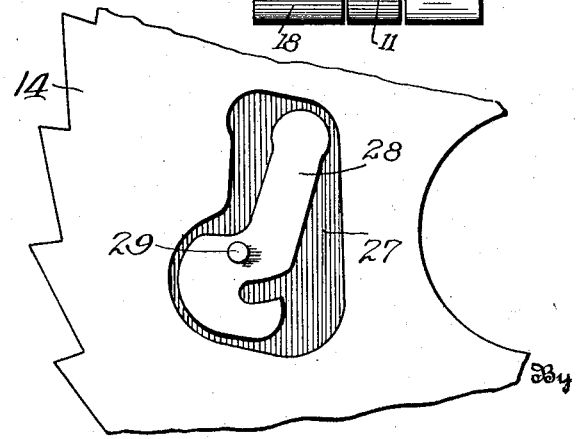

Patented Aug. 25, 1931

1,820,331

UNITED STATES PATENT OFFICE

CORNELIUS VON RIESEN, OF BEATRICE, NEBRASKA

CLUTCH

Application filed May 27, 1929. Serial No. 366,252.

My invention relates to clutches, its object being the provision of an automatic clutch for connecting or disconnecting the shaft almost instantly.

It is also my object to provide a clutch which will instantly disconnect the shaft from the source of power when the movement of one portion of the clutch mechanism is arrested.

Another object which I have in view is the provision of a pawl which is automatically operable to restore the parts to their normal clutching relation and to maintain the parts in clutching relation under normal working conditions.

The clutch was designed initially and primarily for the purpose of regulating or governing the feed of bundles to the separator of a thrashing machine but it may be applied equally as well to carding and weighing machines and to numerous other machines in which it is desired to provide a steady and uniform feed. It is therefore my object to provide a clutch which is capable of use in machines of various kinds.

Having in view these objects and others which will be pointed out in the following description, I will now refer to the drawings, in which Figure 1 is a view in perspective showing all parts of the clutch in disassembled relation, each of the disks being broken away to better disclose their form.

Figure 2 is a plan view of the end of the clutch and showing especially the ratchet disk and its interlocking relation with the intermediate disk.

Figure 3 is a perspective view of a portion of the ratchet disk.

Figure 4 is a view in perspective of the lever which is seated in the socket of the ratchet disk.

Figure 5 is a perspective view of the spring pressed pawl.

Figure 6 is a view in perspective of a portion of the intermediate disk.

Figure 7 is a transverse median sectional view of the clutch assembly.

Figure 8 is a transverse sectional view of the clutch assembly cutting the clutch element 11 in a plane just back of the projection 13 and showing the pawl 21 in its normal engagement with the ratchet teeth.

Figure 9 is a plan view of a fragment of the ratchet disk, showing particularly the socket for receiving the lever.

Figure 10 is a plan view of the intermediate disk with its disk-shaped projection, showing also the slidable pawl.

In the figures, the numeral 10 indicates the clutch shaft carrying the various disks. The intermediate disk 11 is keyed at 11' or otherwise secured to rotate with the shaft 10. This disk is provided with two disk shaped projections 12 and 13 integral therewith. The ratchet disk 14 is provided with a central opening for receiving the projection 12 and the collar 15 is adapted to be seated on the projecting portion of the projection 12. As shown in Figure 2, the collar 15 is secured to the projection 12 by means of fastening devices 16 which project radially and constitute a means for securing the collar 15 to the intermediate disk 11 so that the two will normally rotate in unison with the disk 14 loosely positioned between them. The disk 14 is, however, secured to the projecting portions of the fastening devices 16 by means of coil springs 17 which normally maintain the disks 11 and 14 in a definite position relative to each other but which permit limited rocking movement between these two disks.

The disk 18 through which the drive is applied, is loosely mounted on the shaft 10 and it is provided with an internal ratchet 19. The projection 13 is seated within the hollow portion of the disk 18 when the parts are in their assembled relation and the projection will then lie in the plane of the ratchet 19. As shown in Figure 6, the projection 13 is provided with a groove 20 for receiving the pawl 21. The pawl is provided with a shoulder 22 which is normally seated against the shoulder 23 in the projection 13, the shoulders 22 and 23 limiting the outward movement of the pawl 21 in the groove 20. The compression spring 24 is positioned between the base of the pawl 21 and the bottom of the groove 20 so that it normally keeps the pawl in its operative position which is limited by the shoulders 22 and 23.

The pawl 21 is further provided with a pin 25 which projects through the slot 26 of the intermediate disc 11. The ratchet disc 14 is provided with a socket 27 for receiving the lever 28 which is fulcrumed on the pin 29 passing through the aperture 30 of the intermediate disc 11, the lever having a hooked portion which is adapted to engage the pin 25 of the pawl 21.

In the operation of the clutch the various members are interlocked as described and only the disc 11 is secured to rotate with the shaft 10. When the load becomes excessive, as for example when feeding bundles to the thrashing machine, a detent or other stop 31 is provided which will automatically drop against the periphery of the ratchet disc 14. This arrests the motion of the ratchet disc 14 almost immediately but the disc 11 is still carried forwardly. The lever 28, which is pivoted to the disc 11, is thus carried forwardly in the socket 27 of the ratchet disc 14 which is stationary. As the lever 28 is depressed in the socket 27, the curved wall of the socket 27 swings the lever 28 about its pivot 29. The hook portion of the lever 28 then engages the pin 25 to depress the pawl 21 which is thus released from engagement with the ratchet 19 of the driving disc 18. In the present instance the driving disc 18 is shown as a belt pulley but it is obvious that any other form of drive may be applied. Since the disc 18 is loose on the shaft 10, it will rotate idly on the shaft after the pawl 21 has been disengaged from the ratchet 19 and the discs 11 and 14 as well as the shaft 10 will remain stationary.

When the load of the feeding apparatus becomes lighter, the detent or stop 31 will be automatically released. The springs 17, which were placed under tension at the beginning of the stopping operation, will almost instantly restore the discs 11 and 14 to their operative relation. The cavity or socket 27 is pear-shaped and the upper portion of the lever 28 normally occupies a position in the enlarged portion of the socket or cavity. Two movements take place between the disc 14 and the lever 28. One of these is a sliding movement while the other is a pivotal movement of the lever 28 about its pivotal connection 29 with the disc 11. The action of the springs 17 results in a slight relative angular movement of the discs 11 and 14 and it thus slidably shifts the lever 28 in the socket 27. The shifting, of course, can take place only about the pivot 29 which forces the upper portion of the lever 28 into the enlarged portion of the socket or cavity so that its notched portion is out of engagement with the pin 25. The lower wall of the notch in the lever 28 will then act positively to bear radially outwardly against the pin 25 to force the pawl 21 into engagement with the ratchet 19, thus automatically restoring the clutch parts to their clutching relation when the load becomes light enough to warrant it. The spring 24, acting in a radial direction on the base of the pawl 21, also tends to force the pawl into operative engagement with the ratchet 19 of the disc 18. Either the notch of the lever 28 or the spring 24 alone would move the pawl toward the ratchet but they differ in their effects. The action of the lever 28 on the pawl 21 is positive and unyielding but the action stops before full engagement of the pawl with the ratchet. The spring 24, on the other hand, exerts a constant and yielding pressure on the pawl until the pawl is fully seated in the ratchet and it maintains the pawl in full engagement and prevents accidental release due to vibration.

Having thus described my invention in such full, clear, and exact terms that its construction and operation will be readily understood by others skilled in the art to which it pertains, what I claim as new and desire to secure by Letters Patent of the United States is:

1. A clutch including a shaft having thereon a driving disc, an intermediate disc and a clutch releasing disc, said discs being consecutively arranged on said shaft, said intermediate disc being secured to said shaft to rotate therewith and the other two of said discs being loosely journalled on said shaft, an internal ratchet on said driving disc, a pawl slidably secured to said intermediate disc, said pawl being normally in engagement with said ratchet, a lever pivotally secured to said intermediate disc and slidably held to said clutch releasing disc, the arrangement being such that said lever will withdraw said pawl from said ratchet when the movement of said clutch releasing disc is arrested.

2. A clutch including a shaft, a driving member journalled coaxially on said shaft and having a plurality of ratchet teeth arranged concentrically about said shaft, a disc secured to rotate with said shaft, a pawl slidable on said disc into the path of the ratchet teeth of said driving member, means for normally maintaining said pawl in engagement with the teeth of said driving member, a stop member journalled coaxially on said shaft, and a lever pivotally secured to said disc and slidably held to said stop member, said lever being pivotally movable against said pawl to release said pawl from engagement with the ratchet teeth of said driving member and being slidably movable on said stop member to rock said lever when the rotation of said stop member is arrested.

3. A clutch including a shaft having thereon a driving member, an intermediate member and a clutch releasing member, said members being consecutively arranged on said shaft and coaxial therewith, said intermediate member being secured to said shaft to rotate therewith and the other two of said members being loosely journalled on said shaft, a pawl slidably secured to said intermediate member, said driving member being provided with ratchet teeth in the path of said slidable pawl, means for normally maintaining said pawl in engagement with the ratchet teeth of said driving member, a lever pivotally secured to said intermediate member and movable into position to release said pawl from engagement with the ratchet teeth of said driving member, said lever being slidable on said clutch releasing member to move said lever on its pivot when the rotation of said clutch releasing member is arrested.

4. A clutch including a shaft having thereon a driving member, an intermediate member and a clutch releasing member, said members being arranged consecutively on said shaft and coaxial therewith, said intermediate member being secured to said shaft to rotate therewith and the other two of said members being loosely journalled on said shaft, said intermediate member and said clutch releasing member being each provided with a socket eccentrically positioned therein, a pawl slidably secured in the socket of said intermediate member, said driving member being provided with ratchet teeth in the path of said pawl, and a lever pivotally secured to said intermediate member and movable against said pawl to release said pawl from engagement with the ratchet teeth of said driving member, said lever being slidably confined in the socket of said clutch releasing member to move said lever on its pivot when the rotation of said clutch releasing member is arrested.

5. A clutch including a shaft having a disc secured thereto to rotate therewith, a pawl slidable toward and away from the periphery of said disc, a driving member coaxial with said shaft and having a plurality of ratchet teeth arranged concentrically with said shaft and in the path of said pawl, a stop member rotatably mounted on said shaft and coaxial therewith, and a lever pivotally secured to said disc and slidably held by said stop member, said lever being slidably shifted when the rotation of said stop member is arrested and being movable to depress said pawl to disengage said pawl from the ratchet teeth of said driving member.

In testimony whereof I affix my signature.

CORNELIUS von RIESEN.